United States Patent
Baumann et al.

(10) Patent No.: US 6,957,723 B2
(45) Date of Patent: Oct. 25, 2005

(54) FRICTION BRAKE WITH SELF-BOOSTING

(75) Inventors: Dietmar Baumann, Hemmingen (DE); Dirk Hofmann, Ludwigsburg (DE); Herbert Vollert, Vaihingen/Enz (DE); Willi Nagel, Remseck/Hochdorf (DE); Andreas Henke, Diemelstadt (DE); Bertram Foitzik, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/745,575

(22) Filed: Dec. 29, 2003

(65) Prior Publication Data

US 2004/0134723 A1 Jul. 15, 2004

(30) Foreign Application Priority Data

Dec. 31, 2002 (DE) .......................... 102 61 455

(51) Int. Cl.⁷ .............................................. F16D 55/08
(52) U.S. Cl. ..................................... 188/72.7; 188/72.2
(58) Field of Search .............................. 188/71.7–72.9, 188/196 B, 196 BA

(56) References Cited

U.S. PATENT DOCUMENTS

| | | | | |
|---|---|---|---|---|
| 2,303,710 A | * | 12/1942 | Sinclair ..................... | 188/72.6 |
| 2,974,753 A | * | 3/1961 | Allin Sr et al. ............ | 188/71.5 |
| 3,662,864 A | * | 5/1972 | Evans ....................... | 188/72.2 |
| 3,727,727 A | * | 4/1973 | Hauth ....................... | 188/72.9 |
| 4,793,447 A | * | 12/1988 | Taig et al. .................. | 188/72.1 |
| 4,809,819 A | * | 3/1989 | Harrison .................... | 188/71.9 |
| 5,365,804 A | * | 11/1994 | Downs et al. ............... | 74/535 |
| 5,931,263 A | * | 8/1999 | Ericson et al. .............. | 187/373 |
| 6,318,513 B1 | * | 11/2001 | Dietrich et al. ............ | 188/72.7 |

* cited by examiner

Primary Examiner—Chris Schwartz
(74) Attorney, Agent, or Firm—Ronald E. Greigg

(57) ABSTRACT

The invention relates to an electromechanical brake with self-boosting by means of a wedge mechanism. An actuating force is exerted on the friction brake lining via toothing sets that mesh with one another. By means of an engagement angle of the toothing sets, a favorable force introduction angle of the actuating force on the friction brake lining can be attained. In addition, by using a nonround gear wheel and/or a non-straight rack as the toothing sets, flaring of a caliper upon braking and an infeeding motion of the friction brake lining transversely to a brake disk can be compensated for.

8 Claims, 2 Drawing Sheets

FRICTION BRAKE WITH SELF-BOOSTING

BACKGROUND OF THE INVENTION

1. Field of the Invention

The invention relates to a friction brake system with self-boosting, and more particularly to such brake systems which are intended for use in motor vehicles.

2. Description of the Prior Art

Known friction brakes with self boosting are often embodied as disk brakes having electromechanical actuation. The known brakes have a friction brake lining, which for braking can be pressed against a brake body to be braked, such as a brake disk. To achieve self-boosting, wedge mechanisms are known, which have one wedge on a side of the friction brake lining remote from the brake body and braced on a ramp. The ramp extends obliquely to the brake body, preferably at an acute angle; it forms an abutment on which the friction brake lining is braced at a bracing angle, which effects the self-boosting, obliquely to a normal of the brake body. The normal direction refers to a surface of the brake body against which the friction brake lining is pressed upon actuation of the friction brake. The bracing angle is the same size as a wedge angle, or an angle below which the ramp forming the abutment leads to the brake body. The angle at which the ramp leads to the brake body can vary over the course of the ramp, as a result of which the self-boosting also varies. In that case, the ramp is then no longer straight but instead is for instance curved.

For actuation, the friction brake lining is displaced by an actuating force in the direction of a tapering wedge gap between the abutment and the (rotating) brake body moving in the same direction, and as a result the friction brake lining comes into contact with the brake body. A frictional force exerted by the rotating brake body on the friction brake lining urges the latter in the direction of the tapering wedge gap, as a result of which an additional contact pressure of the friction brake lining against the brake body results by way of the abutment. The contact pressure of the friction brake lining against the brake body is thus effected only in part by an actuating device of the friction brake, and for the remainder is effected by a frictional force exerted by the rotating brake body on the friction brake lining. Such friction brakes are known for instance from German Patent DE 198 19 564 C2 or German Patent DE-PS 1 096 220.

However, the invention is not limited to friction brakes with wedge mechanisms for effecting the self-boosting, but instead can in principle be employed equally well in other self-boosting mechanisms, such as a lever system in which the friction brake lining is braced on an abutment via an obliquely placed lever. The invention is not limited to disk brakes, either, but can also be used with other types of brake, such as a drum brake, although theoretically that can be considered an analog to a lever mechanism.

In the aforementioned DE 198 19 564 C2, a number of friction brake linings is distributed over the circumference on an annular disk, on whose side remote from the brake disk wedges are mounted for effecting the self-boosting. For actuation, an electric motor is provided, which has a gear wheel that meshes with an internal toothing of the annular disk.

For the self-boosting C* of a friction brake of the type defined at the outset, the following equation applies:

$$C^* = \frac{F_u}{F_{app}} = \frac{2\mu(\sin\beta + \tan\alpha \cdot \cos\beta)}{\tan\alpha - \mu}$$

in which $F_U$ is the circumferential force, $F_{app}$ is the actuating force exerted on the friction brake lining, $\mu$ is the coefficient of friction, $\alpha$ is the bracing angle or wedge angle, and $\beta$ is the force introduction angle at which the actuating force acts on the friction brake lining. The factor 2 is due to an engagement of both friction brake linings on both sides of a brake disk of a disk brake. If there is only one-sided engagement or a different brake design, the factor is 1. The above equation thus results in a maximum force boosting, that is, a maximum circumferential force $F_U$ for a given actuating force $F_{app}$ as follows:

$$\beta = 90° - \alpha$$

This should not be mistaken for the self-boosting of the brake that is dependent on the bracing angle $\alpha$, which is to be assumed as given in this case. The above equation indicates the most favorable force introduction angle $\beta$; that is, if the actuating device exerts the actuating force on the friction brake lining at the force introduction angle $\beta$ indicated by the above equation, the result is a maximum circumferential force $F_U$, that is, a maximum braking of the brake body for a given actuating force.

OBJECT AND SUMMARY OF THE INVENTION

The invention has the advantage that it has the aforementioned most-favorable force introduction angle $\beta$ precisely, in the ideal case, and in practice at least approximately. For this purpose, the toothing sets meshing with one another, by way of which the actuating device moves the friction brake lining, have an engagement angle $\alpha_e$ of the tooth flanks of their teeth that brings about the desired force introduction angle $\beta$. In a friction brake with a wedge mechanism for actuating the friction brake and for attaining the self-boosting, the direction of force initiation is ideally parallel to the wedge face or ramp along which the friction brake lining is displaced for actuation of the friction brake, and on which the friction brake lining is braced. For a given bracing angle or wedge angle $\alpha$ at a determined actuating force $F_{app}$, the invention achieves a maximum braking force. The engagement angle $\alpha_e$ of the toothing sets can be selected within wide ranges by the choice of tooth flank shapes, so that the desired force introduction angle $\beta$ can be achieved comparatively simply. The self-boosting effect of a friction brake can be well exploited with the invention. Another advantage of using toothing sets meshing with one another is their sturdiness.

BRIEF DESCRIPTION OF THE DRAWINGS

The invention will be better understood and further objects and advantages thereof will become more apparent from the ensuing detailed description of a preferred embodiment taken in conjunction with the drawings, in which.

DESCRIPTION OF THE PREFERRED EMBODIMENT

Figure 1:
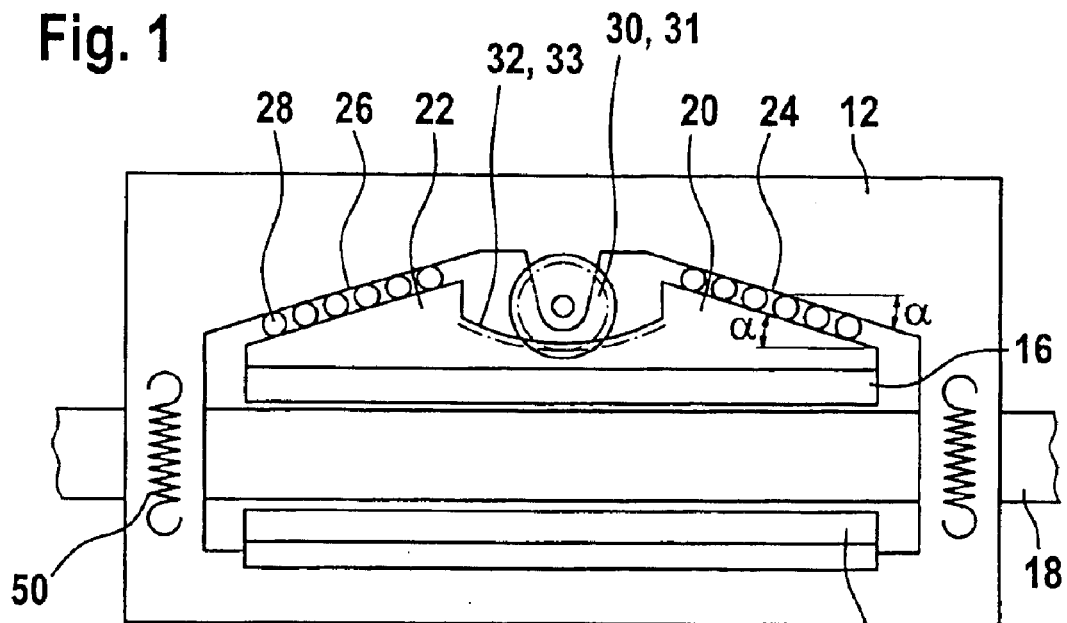
FIG. 1 is a schematic, simplified illustration of a friction brake according to the invention.

The friction brake of the invention, shown in FIG. 1, is embodied as an electromechanically actuated disk brake 10.

It has a caliper 12, in which a friction brake lining 14 rests fixedly and a friction brake lining 16 is disposed movably. Between the two friction brake linings 14, 16 is a brake disk 18, which forms a brake body that is to be braked. The caliper 12 is embodied as a so-called floating caliper; that is, it is movable transversely to the brake disk 18. For braking, the movable friction brake lining 16 is pressed against one side of the brake disk 18. As a result, the caliper 12 is displaced transversely to the brake disk 18, such that the friction brake lining 14 resting fixedly in the caliper 12 presses against the other side of the brake disk 18, and the brake disk 18 is braked by both friction brake linings 14, 16. The invention is not limited to a floating caliper brake, but instead can also be employed in other types of brake, such as brakes with a fixed caliper.

The disk brake 10 has self-boosting; to that end, it has two wedges 20, 22, oriented counter to one another, which are disposed on a side of the movable friction brake lining 16 remote from the brake disk 18. The wedges 20, 22 are braced on ramps 24, 26 of the caliper 12, which form abutments for the wedges 20, 22 and the movable friction brake lining 16. The ramps 24, 26 are at an acute angle, hereinafter called the bracing angle α, to the brake disk 18, and the bracing angles a match wedge angles of the wedges 20, 22 which are therefore likewise called angles α. To reduce friction, roller bodies (rollers) 28 may be disposed between the wedges 20, 22 and the ramps 24, 26.

For braking, the movable friction brake lining 16 is displaced with one of its two wedges 20, 22 along the associated ramp 24, 26; that is, the movable friction brake lining 16 is displaced parallel to the respective ramp 24, 26, and in the process moves toward the brake disk 18. For braking, the friction brake lining 16 is always displaced in the direction of rotation of the brake disk 18, that is, in the direction of a tapering wedge gap between the ramp 24, 26 and the brake disk 18. The respective other wedge 22, 20 with the associated ramp 26, 24 is used for braking in the opposite direction of rotation of the brake disk 18 (driving in reverse). The wedge and bracing angles a of the two ramps 24, 26 and of the two wedges 20, 22 are the same, in the exemplary embodiment of the invention shown; that is, the self-boosting of the disk brake 10 is the same in both forward and reverse travel. To attain a different self-boosting in forward and reverse travel, the wedge and bracing angles can be different. It is also known and possible for the bracing angles α of the ramps 24, 26 to vary in their course, that is, to vary with a displacement path of the movable friction brake lining 16. The ramps 24, 26 in that case are no longer straight but are instead curved. As a result, the self-boosting of the disk brake 10 varies with increasing displacement of the movable friction brake lining 16, or in other words with increasing actuating and braking force.

Figure 2:
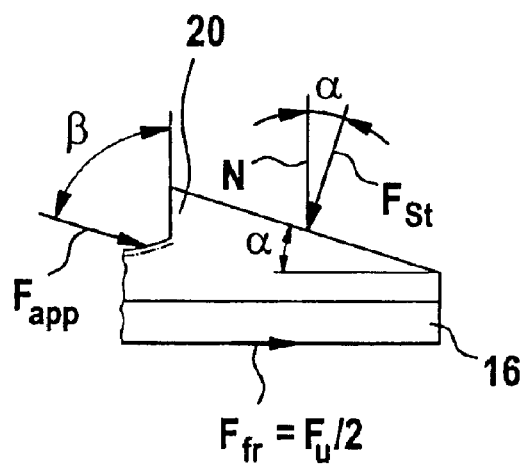
FIG. 2 shows forces at a wedge of the friction brake of FIG. 1.

For braking, as already noted, the friction brake lining 16 is displaced in the direction of the tapering wedge gap between one of the two ramps 24, 26 and the brake disk 18 and is thereby moved toward the brake disk 18 and pressed against it. A frictional force exerted by the rotating brake disk 18 on the friction brake lining 16 urges the friction brake lining 16 in the direction of the tapering wedge gap. As a result, the contact pressure of the friction brake lining 16 against the brake disk 18 increases, and thus the frictional force between the friction brake lining 16 and the brake disk 18 increases as well. The result is the aforementioned self-boosting of the disk brake 10. For making this subject matter clearer, the right-hand part of the movable friction brake lining 16 is shown in FIG. 2, and the frictional force $F_{fr}$ exerted on it by the rotating brake disk 18 is shown, along with a bracing force $F_{st}$ exerted on the wedge 20 by the ramp 24. The wedge and bracing angles α are also shown, between the bracing force $F_{st}$ and a normal, marked N, to the brake disk 18. Since both friction brake linings 14, 16 are pressed one from each side against the brake disk 18 with the same contact pressure, the resultant frictional force $F_{fr}$ is doubled, forming the circumferential force $F_U$, which is also called the braking force. For the opposite direction of rotation of the brake disk 18, the movable friction brake lining 16 is displaced in the opposite direction, and the self-boosting mechanism functions analogously.

Figure 3:
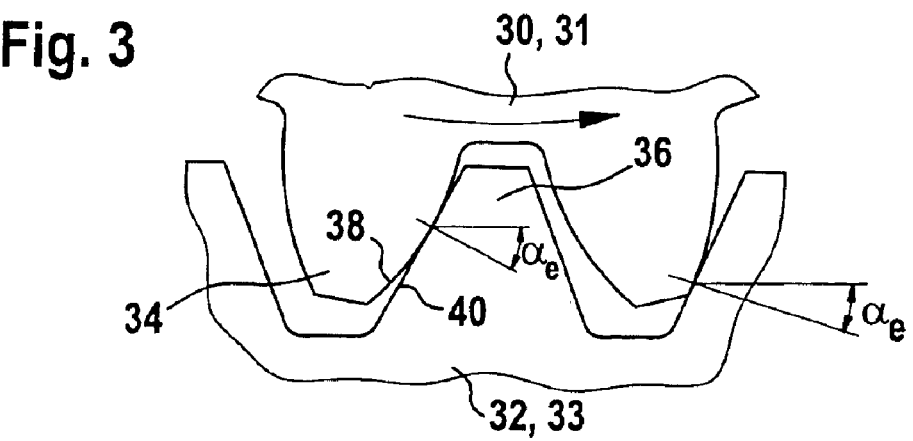
FIG. 3 is a sketch of the engagement angle $\alpha_e$ of an involute toothing set of the friction brake of FIG. 1.

For displacing and pressing the movable friction brake lining 16 against the brake disk 18, the disk brake 10 has an actuating device, which includes two toothing sets 30, 32 meshing with one another. In the exemplary embodiment of the invention shown, one of the two toothing sets 30 is embodied as a gear wheel 31, which can be driven to rotate by means of an electric motor, not shown, optionally with the interposition of a speed-reducing gear. In the exemplary embodiment shown, the other toothing set 32 is embodied as a rack 33. In this exemplary embodiment of the invention, the rack 33 is joined integrally to the wedges 20, 22 of the movable friction brake lining 16; that is, the rack 33 is rigidly joined to the movable friction brake lining 16. The gear wheel 31 is supported rotatably in the caliper 12. The two toothing sets 30, 32 are embodied as involute toothing sets, although this is not compulsory. Teeth 34, 36 of the toothing sets 30, 32 mesh with one another at an engagement angle $α_e$, as shown in FIG. 3. On the precondition that the rack 33 extends parallel to the brake disk 18, the engagement angle $α_e$ is equal to a force introduction angle β, at which the gear wheel 31 exerts an actuating force $F_{app}$ on the rack 33 and thus also on the wedges 20, 22 of the movable friction brake lining 16 (see FIG. 2).

For the ratio between the circumferential force $F_U$, exerted on the brake disk 18 by the movable friction brake lining 16 pressed against the brake disk 18, which force, because the two friction brake linings 14, 16 are pressed against the brake disk 18 with the same contact pressure, is equal to twice the value of the frictional force $F_{fr}$, effected between the brake disk 18 and the friction brake lining 16, and the actuating force $F_{app}$ exerted by the actuating device on the movable friction brake lining 16, the applicable equation is:

$$C^* = \frac{F_u}{F_{app}} = \frac{2\mu(\sin\beta + \tan\alpha \cdot \cos\beta)}{\tan\alpha - \mu}$$

in which μ is the coefficient of friction between the friction brake lining 16 and the brake disk 18, α is the wedge or bracing angle, and β is the force introduction angle; the force introduction angle β matches the engagement angle $α_e$ of the toothing sets 30, 32, if the rack 33 extends parallel to the brake disk 18. If the rack 33 is not parallel to the brake disk 18, the engagement angle $α_e$ and the force introduction angle β differ by the angle between the rack 33 and the brake disk 18. A factor C* is also called the force boosting. For a given wedge and bracing angle α, a maximum force boosting occurs for a force introduction angle of β=90°−α. This means that the actuating force $F_{app}$, in the ideal case, should act on the friction brake lining 16 parallel to the slopes of the wedges 20, 22 and ramps 24, 26. This most-favorable force introduction angle β and engagement angle $α_e$ can be achieved according to the invention by means of the shape of tooth flanks 38, 40 of the teeth 34, 36 of the toothing sets 30, 32 meshing with one another. Attaining approximately the most-favorable angle should be considered to be inventive. The use of toothing sets 30, 32 for displacing the movable friction brake lining 16 for actuating the disk brake 10 thus has the advantage that the force introduction angle β, for attaining a high contact pressure of the friction brake lining 16 against the brake disk 18 with a given actuating force $F_{app}$, is comparatively easily adjustable by means of the shaping of the tooth flanks 38, 40 of the teeth 34, 36 of the toothing sets 30, 32 meshing with one another and the engagement angles $\alpha_e$, which can be adjusted in this way, of the toothing sets 30, 32. Another advantage of using toothing sets 30, 32 for transmitting the actuating force $F_{app}$ to the friction brake lining 16 is their sturdiness as well as their lack of vulnerability to tolerances in production and assembly. For instance, the efficiency and function of the toothing sets 30, 32 vary only slightly if a depth of engagement of the teeth 34, 36 of the toothing sets 30, 32 decreases. Such a decrease in the engagement depth of the teeth 34, 36 can occur as a consequence of an elastic flaring of the caliper 12 upon braking. The elasticity of the caliper 12 is represented in FIG. 1 by the tension spring symbol 50.

To compensate for flaring of the caliper 12 as a result of the contact pressures of the friction brake linings 14, 16 against the brake disk 18 that occur in braking, the disk brake 10 uses a nonround gear wheel 31. The nonround gear wheel 31 likewise compensates for an infeeding motion of the movable friction brake lining 16 transversely to the brake disk 18 upon displacement along the ramps 24, 26. Besides the flaring of the caliper 12, elasticities of the friction brake linings 14, 16 should for instance be taken into account as well.

Another possible way of compensating for flaring of the caliper 12 from the contact pressures of the friction brake linings 14, 16 against the brake disk 18 and compensating for the infeeding motion of the movable friction brake lining 16 transversely to the brake disk 18 is to use a non-straight rack 33. The rack 33 can be curved in concave fashion, as shown in FIG. 1. It is also possible for the rack 33 to have two straight portions, extending obliquely to the brake disk 18, on the left and right of the gear wheel 31 for forward and reverse travel (this option is not shown). If the rack 33 is not parallel to the brake disk 18, the force introduction angle β, at which the toothing sets 30, 32 exert the actuating force $F_{app}$ on the friction brake lining 16, and the engagement angle $\alpha_e$, at which the two toothing sets 30, 32 mesh with one another, differ by the angle between the rack 33 and the brake disk 18. Since with a curved rack 33 the angle between the rack 33 and the brake disk 18 varies over the course of the rack 33, the engagement angle $\alpha_e$ ideally also varies to the same extent over the course of the rack 33.

Figure 4:
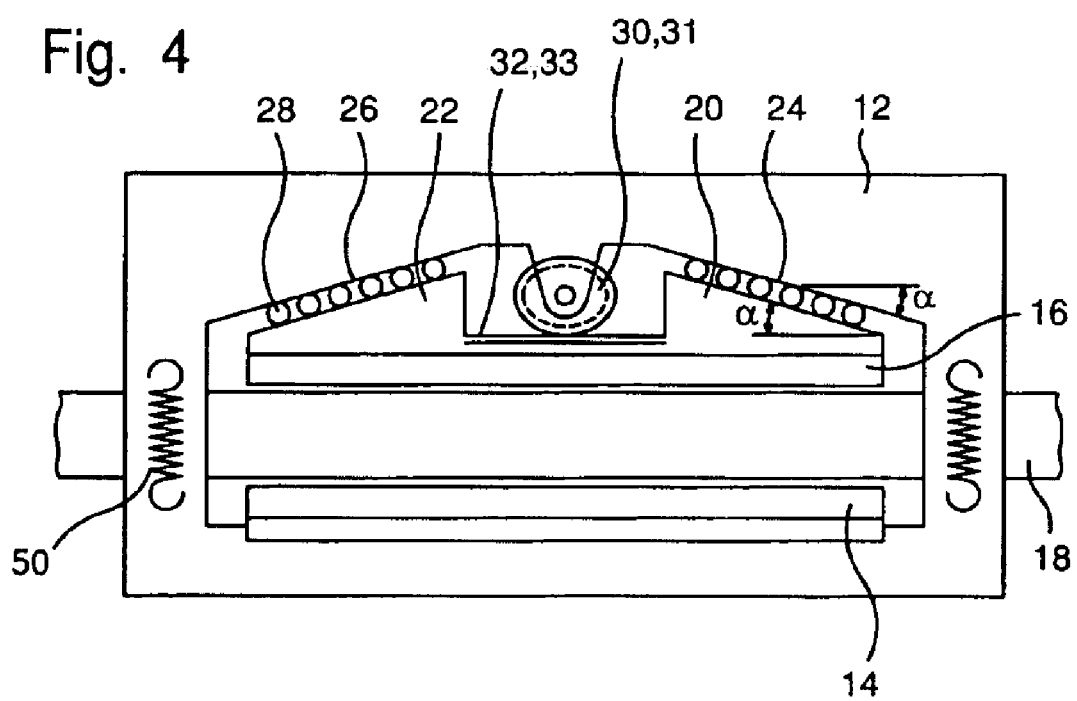
FIG. 4 is a schematic, simplified illustration of a friction brake according to a further embodiment of the invention.

The shape of the gear wheel 31 and of the rack 33 required to compensate for the flaring of the caliper 12 and for the infeeding motion of the movable friction brake lining 16 results from the properties of the parts of the disk brake 10, and in particular the force-dependent flaring of the caliper 12 and as applicable the elasticity of the friction brake linings 14, 16. For the sake of simpler production, preferably either a round gear wheel 31 together with a non-straight rack 33, or conversely a nonround gear wheel 31 together with a straight rack 33 (see FIG. 4), or a rack 33 with straight rack portions, for forward and reverse travel will be used. However, both options are shown. It is also possible, by means of a nonround gear wheel 31, to attain a fast infeeding motion of the movable friction brake lining 16 transversely to the brake disk 18, to overcome air play between the friction brake lining 16 and the brake disk 18 at the onset of actuation of the disk brake 10. In that case, compensating for flaring of the caliper 12 from the contact pressures upon braking is preferably accomplished by the aforementioned non-straight rack 33. If the caliper 12 and the friction brake linings 14, 16 are all rigid, it is possible under some circumstances to dispense with compensation for flaring of the caliper 12 from the contact pressures upon braking; that is, it can be possible to use a round gear wheel 31 and a straight rack 33. This option is due in part to the fact that the toothing sets 30, 32 are not vulnerable to a reduction in the engagement depth of their teeth 34, 36, as has already been noted above.

It is understood that the reverse disposition is also possible, that is, with the gear wheel 31 on the friction brake lining 16 and with the rack 33 on the caliper 12. The disposition of the gear wheel 31, or in the reverse case the rack 33, on some other part than the caliper 12 is also possible, for instance on a fixed caliper holder (not shown).

The foregoing relates to a preferred exemplary embodiment of the invention, it being understood that other variants and embodiments thereof are possible within the spirit and scope of the invention, the latter being defined by the appended claims.

We claim:

1. In a friction brake with self-boosting, the friction brake comprising
   a friction brake lining which can be pressed for braking against a brake body to be braked,
   an abutment for the friction brake lining on which the friction brake lining is braced at a bracing angle α, which effects the self-boosting, obliquely to a normal of the brake body, and
   an actuating device with which the friction brake lining can be pressed against the brake body for braking, and the actuating device having two toothing sets, meshing with one another, one of which is drivable and the other of which is operatively connected to the friction brake lining and acts on the friction brake lining at a force introduction angle that is oblique to a normal of the brake body,
   the improvement wherein the toothing sets (30, 32) meshing with one another have an engagement angle $\alpha_e$ which produces a force introduction angle β, at which the toothing sets exert an actuating force on the friction brake lining, of approximately 90° minus the bracing angle α.

2. The friction brake of claim 1, wherein one of the two toothing sets (30) comprises a nonround gear wheel (31), which compensates at least in part for a deformation of the friction brake (10) by a contact pressure, occurring upon braking, of the friction brake lining (16) against the brake body (18) and/or an infeeding motion of the friction brake lining (16) in the direction of the brake body (18) upon braking.

3. The friction brake of claim 1, wherein the toothing set (30) comprises a nonround gear wheel (31), which in a basic position, with the friction brake lining (16) lifted from the brake body (18), has a greater effective radius than when the friction brake (10) is actuated.

4. The friction brake of claim 1, wherein the two toothing sets (30, 32) comprise a rack (33).

5. The friction brake of claim 4, wherein the rack (33) is not straight but instead has a course such that it at least partly compensates for a deformation of the friction brake (10) by a contact pressure, occurring upon braking, of the friction brake lining (16) against the brake body (18) and/or an infeeding motion of the friction brake lining (16) in the direction of the brake body (18) upon braking.

6. The friction brake of claim 1, wherein at least one of the toothing sets is an involute toothing set.

7. The friction brake of claim 1, wherein the friction brake (10) further comprises one abutment (24, 26) for the friction brake lining (16) for each direction of rotation of the brake body (18), on which abutment the friction brake lining (16) is braced at a bracing angle α, which effects the self-boosting for the particular direction of rotation of the brake body (18), obliquely to a normal of the brake body (18).

8. The friction brake of claim 1, wherein the actuating device further comprises an electric motor for actuation.

* * * * *